United States Patent [19]
Becker et al.

[11] 3,855,080
[45] Dec. 17, 1974

[54] RECOVERY OF CAPROLACTAM FROM OLIGOMERS BY HEATING AND FILM DISTILLATION

[75] Inventors: Lothar Becker, Ludwigshafen; Kurt Kahr, Neustadt; Guenther Rapp, Ludwigshafen; Otto Waschka, Mannheim, all of Germany

[73] Assignee: Badische Anilin- & Soda- Fabrik Aktiengesellschaft, Ludwigshafen/Rhine, Germany

[22] Filed: July 6, 1972

[21] Appl. No.: 269,456

[30] Foreign Application Priority Data
July 14, 1971 Germany.................. 21 35 085

[52] U.S. Cl............... 203/89, 203/91, 260/239.3 A
[51] Int. Cl.......................... B01d 1/22, C07d 41/06
[58] Field of Search ......... 260/239.3 A; 203/14, 17, 203/39, 43, 89, 91; 159/13 A–13 C

[56] References Cited
UNITED STATES PATENTS

| | | | |
|---|---|---|---|
| 3,600,381 | 8/1971 | Yamamoto | 260/239.3 A |
| 2,952,675 | 9/1960 | Bolle | 260/239.3 A |
| 3,252,502 | 5/1966 | Eckardt | 203/89 |
| 3,449,220 | 6/1969 | Geisler | 203/89 |
| 3,686,077 | 8/1972 | DeKoning | 203/89 |
| 3,497,500 | 2/1970 | Kyle | 260/239.3 A |

*Primary Examiner*—Wilbur L. Bascomb, Jr.
*Attorney, Agent, or Firm*—Johnston, Keil, Thompson & Shurtleff

[57] ABSTRACT

Caprolactam is recovered from a mixture which contains caprolactam and oligomers of the same by distillation at temperatures above the melting point of the oligomers or mixture thereof contained in the residue at atmospheric or slightly increased pressure. The process is of importance for removing residues of caprolactam oligomer residues and thus for effluent pollution control.

2 Claims, No Drawings

RECOVERY OF CAPROLACTAM FROM OLIGOMERS BY HEATING AND FILM DISTILLATION

The invention relates to the recovery of caprolactam from mixtures of caprolactam and oligomers by distillative separation.

It is known from East German Pat. No. 59,094 that caprolcatam can be recovered from aqueous extracts of polycaprolactam by evaporating the extraction water and separating caprolactam from its oligomers in the remaining bottoms by distillation at a lower boiling temperature in vacuo. It is a disadvantage that at the lower temperatures used in the vacuum distillation the oligomers remaining in the residue often suddenly solidify with crystallization, for example when there is a fluctuation in temperature or pressure, cannot be removed continuously from the distillation chamber and clog the outlet as soon as the lactam level is below a certain value. If this is to be avoided, a major loss of monomers has to be tolerated in order to maintain flowability. Separation is by dilution with water and gives rise to an oligomeric sludge which constitutes a considerable pollution problem.

We have now found that continuous complete separation of caprolcatam from its oligomers which is not attended by crystallization of the oligomers is achieved and the disadvantages of the prior art methods are avoided in the recovery of the caprolactam from a mixture which contains caprolactam and its oligomers by carrying out the distillation of the caprolactam at a temperature above the melting point of the mixture of oligomers to be separated, at atmospheric or superatmospheric pressure. Wash or extraction water, with which polycaprolactam has been freed from unreacted caprolactam or caprolcatam formed under equilibrium conditions, generally contains from 3 to 15 percent of monomeric caprolactam and its oligomers, particularly dimers, trimers, tetramers and pleionomers. Separation of caprolactam and its oligomers from water may be carried out for example by simple evaporation or by extraction with organic solvents such as benzene, chloroform or methylene chloride, if necessary after purification, for example by means of an ion exchanger. The mixture thus obtained generally contains 70 to 85 percent by weight of caprolactam and 15 to 30 percent by weight of its oligomers. A typical composition of such a mixture (cf. H. Zahn, Makr. Ch., 43, 220 (1961) is:

|  | Proportion in % by wt. | Melting point of pure compound |
|---|---|---|
| monomers | 76 | 69.2°C |
| dimers | 12.5 | 342°C |
| trimers and tetramers | 4.9 | 215°C / 228°C |
| pentamers | 3.6 | 254°C |
| hexamers and higher oligomers | 3.0 | 258°C |

The setting point for oligomer mixtures which are practically devoid of monomers is about 260° to 280°C.

According to the invention, caprolactam-oligomer mixtures are melted and generally heated at temperatures of from 250° to 350°C, particularly from 275° to 310°C.

It is advantageous to carry out the separation of caprolactam and its oligomers according to the invention continuously and any pretreatment of aqueous washing or extraction liquors of polycaprolactam by evaporation or extraction with organic solvents may also be carried out continuously.

It is favorable to carry out the separation of caprolactam and its oligomers by distillation in falling film evaporators.

It is surprising that at the high temperatures used according to the invention an effective separation of caprolactam takes place without the latter undergoing thermal damage such as discoloration. The quality of the distilled caprolactam is completely satisfactory so that it can be processed without difficulty into pure caprolactam for example by extraction, distillation or crystallization and used again for the production of polycaprolactam. The content of caprolactam in the distillation residue is negligible.

The residue obtained in the process according to the invention is a melt of oligomers in the abovementioned ratio devoid of caprolactam. The residue can be supplied to an incinerator, or solidified and dumped. The residue may also be worked up for example by hydrolysis. The process according to the invention thus helps solve the effluent problem in caprolactam processing. The following Example illustrates the invention.

EXAMPLE

A dehydrated mixture of caprolactam and its oligomers of the following composition: 76.15 percent by weight of caprolactam and 23.85 percent by weight of oligomers is heated as a melt by means of steam at 18 atmospheres gauge and a temperature of from 180° to 190°C. This melt is pumped continuously in an amount of 8.15 kg/hour into a falling film evaporator and caprolactam is distilled off at atmospheric pressure. The temperatures are 305°C in the evaporator bottoms and 250°C in the top of the evaporator. 6.2 kg of caprolactam per hour distils over while 1.95 kg per hour is continuously drawn off as bottoms. The temperature of the melt of oligomers drained off from the bottoms is from 260° to 275°C. The distillate contains about 0.5 percent by weight of oligomers. Practically no caprolactam can be detected in the bottoms.

We claim:

1. A continuous process for separating caprolactam from a mixture containing from about 70 to 85 percent of caprolactam and from 15 to 30 percent of oligomers of caprolactam which comprises heating said mixture of caprolactam and oligomers to a temperature of from 250° to 350° C to obtain a melt; feeding said melt to a falling film evaporator held at atmospheric pressure or slightly above atmospheric pressure, whereby caprolactam is distilled off, and continuously removing said oligomers from said evaporator as bottoms.

2. A process as claimed in claim 1, wherein the mixture of caprolactam and oligomers has been obtained from extraction liquids of polycaprolactam.

* * * * *